C. L. REMPES.
TIRE TREAD.
APPLICATION FILED JULY 8, 1907.
933,110.
Patented Sept. 7, 1909.
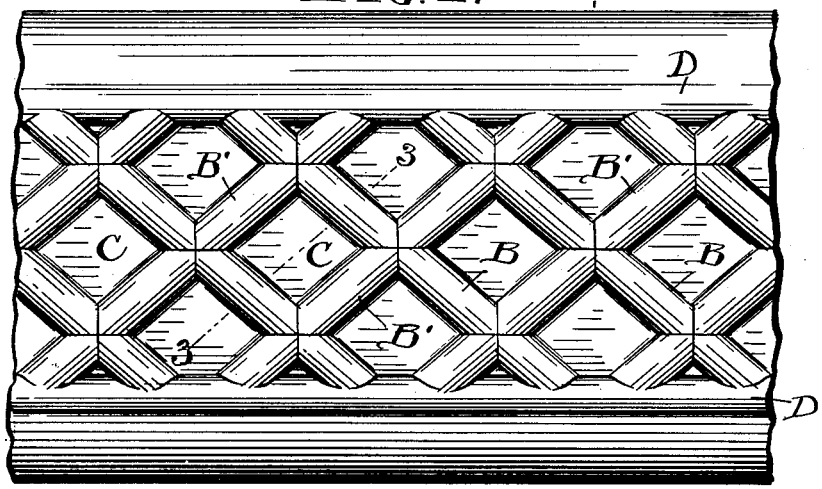
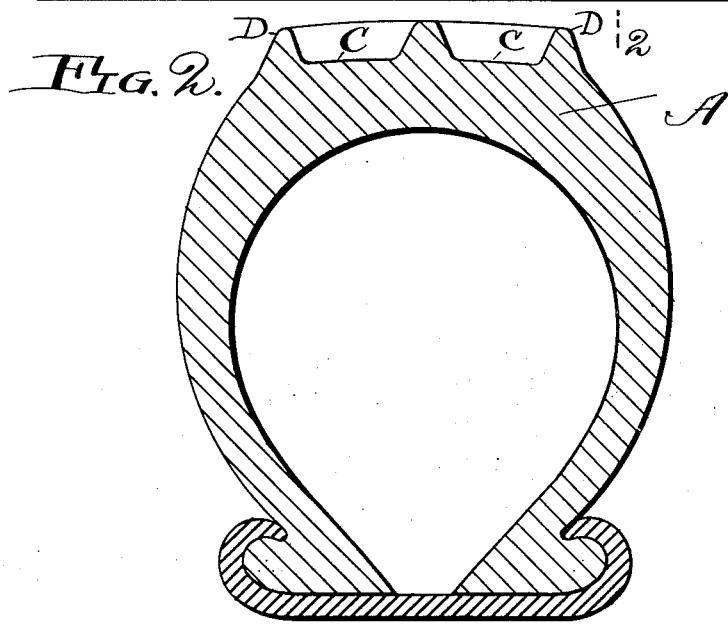
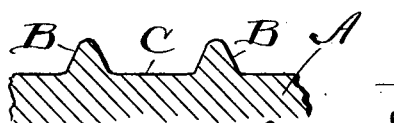
Witnesses
E. B. Gilchrist
H. R. Sullivan
Inventor
Charles L. Rempes
by
Thurston Woodward
Attorneys

UNITED STATES PATENT OFFICE.

CHARLES L. REMPES, OF AKRON, OHIO.

TIRE-TREAD.

933,110.

Specification of Letters Patent.　Patented Sept. 7, 1909.

Application filed July 8, 1907. Serial No. 382,654.

*To all whom it may concern:*

Be it known that I, CHARLES L. REMPES, a citizen of the United States, residing at Akron, in the county of Summit and State of Ohio, have invented a certain new and useful Improvement in Tire-Treads, of which the following is a full, clear, and exact description.

The object of the present invention is to provide an improved form of tire tread which shall prevent skidding and afford an increase in the tractive quality of the tire.

It is my purpose to accomplish the results desired by means of a structure which may be readily manufactured at comparatively small expense, but which shall, at the same time, be not only efficient, but have an endurance and length of life which render it economically possible to use it on heavy machines, such as automobiles. I am aware that this is a field that has been highly developed by experimenters, and I am familiar with the devices which have heretofore been tried for accomplishing the same purposes. But, while some of these have advantages of one sort, they have disadvantages, either as to their method of manufacture or operation, which cause them to fall short of what I regard as the proper standard of utility.

It has been proposed to roughen the treads of bicycle tires in many different ways. Some of these tires, as well as some automobile tires, have been ribbed circumferentially; others have been roughened and pitted by having a knurled die wheel run over the rim while in the mold, a portion of the mold being removed for this purpose. This last method, however, is applicable only to light tires, and the pits made thereby are only useful upon the theory that they serve as suction cups, as it is impossible by nurling to displace the rubber to such an extent as to make the rubber between the pits of sufficient mass to serve as resisting projections, and thereby increase the tractive effect or prevent sidewise skidding. This fact has been recognized by the makers of tires, and they have, with this class of bicycle tires, sought to do no more than to make the divisions between the pits of a thin feather edge, so as to fit asphalt or smooth surfaces and cause the cells or pits to act effectively as suction cups.

As distinguished from the above, and other structures which have been introduced into the art, I have invented a tread having an arrangement of tractive ribs disposed with regard to each other in a unique manner, as will appear by reference to the following specification, and accompanying drawings, in which—

Figure 1 is a plan view showing a portion of the tread, and Fig. 2 is a section through the same along the line 2—2 of Fig. 1. Fig. 3 is a detail section along the line 3—3 of Fig. 1.

At the tread portion of the tire A, which is of the sort ordinarily used in automobiles and adapted to sustain and draw heavy loads, I provide, for a space extending approximately two inches across the face, diagonally disposed ribs B, B' making angles of about forty degrees with the central plane of the tire. These ribs are about three-eighths of an inch deep and three-eighths of an inch thick at their bases. I have two sets of ribs oppositely disposed to each other. That is to say, the ribs B of one series are parallel and inclined in one direction, making an angle of about forty degrees with the plane of the tire, while the ribs B' of the other series are likewise parallel and at the same angle to the plane of the tire, but inclined in the opposite direction. The parallel ribs, at their nearest points, are approximately three-quarters of an inch apart. The intervening surfaces C formed by this arrangement are diamond shaped. These angular recesses have all of their tapering walls inclined downwardly toward the center thereof and are disposed with an angle directed longitudinally of the tread, but it is to be particularly noted that they are not pits or cells formed by nurling tools, since they are broad, substantially flat surfaces, such as can only be formed by molds. The tread is provided at its outer periphery with parallel longitudinally extending tapering side ribs D between which the tapering intersecting ribs extend diagonally from one side rib to the other to form angular recesses. This is an important point, since it is a particular characteristic of such cells and pits as have been previously made, that they are of an inverted pyramidal or hemispherical form with the unfortunate result that any piercing object, such as pins or tacks, lying in the path of the wheel, would be directed, by reason of the inclined walls of the cells, to a normal or vertical piercing position in the center of the cell, even though they might have been lying at some other angle when first encountered. The ribs of my tire, while of course tapered somewhat so as to make them readily removable from the mold, are spaced widely apart so that the intervening space is, as above stated, practically flat, except to the extent to which it conforms to the general convex curvature of the tire. By so spacing the ribs apart that the intervening surface is flat, as distinguished from pyramidal or convex, there will be no tendency to guide tacks, nails or similar sharp articles around to the normal or vertical position after the manner of certain prior structures referred to above. The formation of the ribs of increasing diameter toward the body of the tread causes them to release clogging material from the intermediate recesses. When the ribs are in contact with the ground and under pressure the diameter of the recess is decreased by the lateral expansion thereof and when this pressure is released the ribs contract to their normal diameter thus releasing any material held in the recesses. Further, by having the ribs spaced widely apart in this manner and by having them deep, thick and coarse enough to form resistant masses, I obtain a gripping action upon the ground and pavement which prevents sidewise skidding to an extent which would be impossible were these dividing ridges merely thin and flexible. With rigid ribs of this structure disposed diagonally and in opposite directions, after the manner above set forth, the chances of skidding are reduced to a remarkable degree, since the skidding takes place in a sidewise and forward direction and it appears that the angle at which the rigid ribs are set is of the greatest importance in overcoming this tendency. It is obvious also that, in addition to the prevention of the skidding movement, the ribs disposed according to the manner of my invention also increase the tractive quality of the tire, since the resistance of the oppositely disposed diagonal ribs is such as to give the tire a firm grip upon both asphalt streets and ordinary roads without tending to push the tire to either side of the line of travel. These and many other advantages will appear to those skilled in the art.

Having thus described my invention, I claim:

An annular tire tread having upon its outer periphery parallel longitudinally extending tapering side ribs and tapering intersecting ribs of increasing diameter toward the body of the tread and extending diagonally from one side rib to the other to form angular recesses all walls of which incline downwardly toward the center thereof and with an angle directed longitudinally of the tread.

In testimony whereof, I hereunto affix my signature in the presence of two witnesses.

CHARLES L. REMPES.

Witnesses:
H. R. SULLIVAN,
E. B. GILCHRIST